United States Patent Office 2,909,869
Patented Oct. 27, 1959

2,909,869
DIRECT FIELD SEEDING

Harry A. Dresser, Chicago, Ill., assignor to Zonolite Company, Chicago, Ill., a corporation of Montana No Drawing. Application May 28, 1956
Serial No. 587,485

15 Claims. (Cl. 47—58)

The present invention relates to an improved method for the direct field seeding of plants, particularly plants of the character suffering problems of germination, seedling emergence and/or attack from subterranean and surface forms of life.

This application is a continuation-in-part of my copending application, Serial No. 324,126, filed December 4, 1952 (now abandoned).

While the method of the present invention is not limited in its application, the same does have particular applicability to plants of the above stated character, an exemplary one of which is the tomato plant. For this reason, the following description is directed in part to the invention as employed for tomato seeding, it being understood that such specific reference is for the purpose of complete description of the invention and not as comprising a limitation thereon.

In the past, canners of tomato products in the northern parts of the country have grown tomatoes by using set-out plants. However, there are certain problems inherently existent in the use of set-out plants. First, the young plants customarily are raised from seed in more temperate climates, such, for example, as the southeastern portion of the United States, and then must be removed from the ground for shipment to the fields of the northern canners in time to arrive for the northern planting season. In removing the young plants from the ground prior to shipment, the root systems of the plant are frequently damaged. In many cases, the tap root of the young plant is severely damaged or destroyed. The plants must be shipped several hundred miles to the ultimate growing area, during which time the plants are out of the ground for a week or longer. Also, the plants may be delayed in shipping with the result that entire field crews are idle while awaiting the arrival of the plants.

When the plants finally arrive at the fields of the northern canners and are transplanted, the abuse to which the young plants have been subjected reflects itself in a checking of growth after transplanting, due to the fact that the plants have been out of the ground for so long, and a susceptibility of the plants to such conditions as drought and disease, resulting from the damage to their root systems. Furthermore, there is the hazard of bringing diseased plants into the fields. As will be apparent, the cost of raising the young plants from seed, removing the plants from the ground, shipping the same, and employing crews to set the plants out individually is high.

Direct field seeding, on the other hand, offers a number of advantages. First, direct field seeding is much more economical and the resulting plants are sturdier and more vigorous. However, the most important advantage obtained from direct field seeding is that an increased yield is obtained, in the case of tomatoes, an average of two tons of tomatoes more per acre than is obtained from set-out plants. The increased yield may be attributed to the fact that when a plant is started from seed and left in the ground, it is a healthier plant because the root system is not disturbed, the tap root is not damaged or destroyed, and there is no checking in growth.

Because of the advantage of direct field seeding, northern tomato product canners have been extremely interested in developing an effective technique of growing tomatoes by direct field seeding. However, there are several disadvantages to direct field seeding which heretofore have stood in the way of adoption of direct field seeding methods in the tomato industry. The most important disadvantage resides in the fact that tomato seedlings are very delicate and suffer a serious problem of emergence from the field. This is particularly true in the northern portion of the country where spring rains result in the formation of a tough crust on the surface of the soil. Due to their delicate nature, young tomato seedlings suffer substantial difficulty in breaking through this crust, so much so that only a very small percentage of the directly seeded plants ever emerge in average planting seasons. Accordingly, most northern tomato growers feel that direct field seeding is a hazardous procedure and, generally, a grower, if he plants by direct seeding at all, will do so only to the extent of a small percentage of his total acreage. If the seedlings fail to break through the surface crust of the soil, the grower must purchase plants and be put to the added expense of setting them out.

It is an object of the present invention to provide an improved method of direct field seeding overcoming the problems experienced heretofore, and particularly the problem of plant emergence.

I have found that tomato seeds, like other seeds, require a certain covering for protection. Also, the seeds require a certain amount of moisture for germination, and it is desirable to accommodate the presence of air around the seeds to facilitate and stimulate root development during the period of formative plant growth. I have further found that the protective covering for the seeds need not, and in fact, should not be dense or heavy, and should not be subject to crusting if the problem of emergence is to be overcome.

Bearing the foregoing factors in mind, I have sought to provide a seed covering that is lightweight and porous, that will retain moisture for seed germination and that will accommodate the presence of air for root growth. I have found that expanded or exfoliated vermiculite is ideal as a seed covering, for the reasons that the same is lightweight and is not subject to crusting or any such condition, which makes it easy for the seedlings to push through the covering and emerge from the field. Secondly, vermiculite has the natural prerequisites for ideal seed germination: It holds moisture, which is necessary for germination; it is relatively inert; and it holds an abundance of air, which is necessary for the development of healthy, vigorous and large root systems. Other materials which appear to lend themselves to this specialized purpose are perlite, lightweight foamed slag and various combinations of vermiculite, perlite and slag. Also, the mixture of perlite or vermiculite with slag would provide a beneficial seed covering, for example, 60-95% of perlite or vermiculite and 40-5% of slag.

In view of the foregoing, it will be appreciated that the present invention provides as a primary object an improved method of direct field seeding comprising the use of a special material as the covering for seeds planted directly in the field. Preferably, the material is taken from the class of expanded vermiculite, perlite and lightweight foamed slag.

In practicing the method of the present invention, the seeds may be sown or planted generally at the customary planting time for the particular area and crop and at the customary depth in the field all as is well known by those acquainted in the art, and the seeds thereafter are covered with a material of the character defined. In regard to certain crops, however, the time of planting may be advanced a week to ten days earlier than would normally be the case, for the reasons to be pointed out. For the seed covering, I prefer to use expanded or exfoliated vermiculite having a granule size of up to one-eighth inch. The size or grade of vermiculite used within the above range is not of particular concern, since vermiculite is not subject to waterlogging or cementing and always provides adequate space for air and for the passage or penetration of the seedlings. In using other materials, however, the granule size is preferably maintained at substantially one-eighth inch, since the presence of fines in such other materials could result in cementing and waterlogging, which would be disadvantageous.

The method of the present invention may be employed with any crop, particularly with any row or hill-planted crop. In experimentations with both types of crops, I have found that the use of expanded vermiculite as a seed covering results in substantial improvements in the percentage of seedling emergence. For example, with tomatoes, under weather conditions normally resulting in heavy crusting and other disadvantageous soil conditions, normal direct seeding methods may result in a twenty to thirty percent emergence, whereas utilization of the method of the invention results in eighty to ninety percent emergence. Under other soil conditions, my method also results in substantial increases in plant emergence over conventional methods. Accordingly, it will be appreciated that the present invention provides substantial advantages and overcomes the disadvantages heretofore existing with respect to the direct field seeding of plants.

In addition to the foregoing, I have found that the direct field seeding method of the present invention results in further economies, in that the same insures a substantially uniform stand of plants, so that inefficient or wasteful seeding methods may be dispensed with. For example, in the tomato industry, it has been customary heretofore to row plant the seeds despite the fact that tomatoes are raised as a hill crop. The reason for this is that tomatoes, like other crops, can be profitable only if the stand of plants is uniform, that is, if the number of producing hills in a field each has at least one producing plant (or, in the case of row planted crops, that each row is uniform and continuous). To produce a uniform stand of tomato plants, it has heretofore been regarded as essential that the seeds be row planted so that a sufficient number of plants would emerge to provide a fairly uniform stand of plants after cross plowing. In other words, due to the problems of emergence, it has been impractical heretofore to hill plant tomato seeds for the reason that an insufficient number of plants would emerge to produce the requisite stand. Specifically, tomato seeds are normally row planted at a spacing of approximately forty-two inches. Then, after emergence of the seedlings, the grower can determine the advisability of thinning out the plants, If the stand were uniform, the grower could resort to cross plowing to eliminate the excess plants and to provide hills spaced from thirty-six to forty-two inches apart in each row. However, if the stand were not uniform, as is too consistently the case, the grower is presented with the problem of hand chopping the relatively dense portions of the stand and to set out plants in the portions of the field where the plants failed to emerge. As will be appreciated, either of these latter methods is expensive, and the first method is wasteful. In the case of complete or substantially complete failure of emergence, the grower is faced with the problem of hand setting plants if the field is to produce at all.

Since the method of the present invention increases plant emergence to eighty or ninety percent, even under extremely adverse soil and weather conditions, it will be appreciated and I have found that tomato plants may now be hill planted profitably, and that the resulting stand is very uniform. Accordingly, the present invention provides for the attainment of substantial economies in the direct field seeding of various plants, particularly hill planted crops. For example, in row planting tomato seeds it has been customary to use approximately four dollars worth of seed to the acre. By utilizing the present invention and hill planting, the cost of seeds per acre has been reduced to eighty cents, and even less. The cost of the vermiculite, or other material utilized as a seed covering, adds little to the cost of seeding. In fact, the cost of seed and vermiculite, in practicing the method of the present invention, is less than tomato growers have been accustomed to paying for seed alone. In addition, the present invention insures a uniform stand of plants, so that cross plowing, hand chopping and other thinning costs are substantially reduced. By practice of the invention, the overall cost of tomato production per acre has been reduced as much as ten dollars over conventional direct seeding methods.

As has been pointed out hereinbefore, direct field seeding results in a substantial increase in the yield of the field, in the case of tomatoes, two tons per acre. For the sake of comparison, it is to be pointed out that a ton of tomatoes on the commercial market today (1952) is worth approximately thirty dollars. Accordingly, if direct field seeding results in an increased income of sixty dollars, and employment of the method of the present invention renders direct field seeding practical and reduces the grower's cost by at least ten dollars per acre, the overall gain to the grower, by practicing the present invention, is at least seventy dollars per acre, not taking into consideration the economies of direct field seeding over setting out plants.

While the greatest disadvantage of direct field seeding has been referred to hereinbefore as a problem of plant emergence, it is to be pointed out that the problem is not restricted to plant delicacy, but is actually a problem of soil conditions (crusting over) which prevent emergence even of hardy plants, and other soil and weather conditions that prevent or retard germination and successful growth of the plant. Thus, the invention has application to all crops, particularly row and hill planted crops, such as corn, bean, cauliflower, cabbage, celery, lettuce, onion, radish, squash, strawberry, etc. Crops to which the invention is applied with especial advantage are tomato, cotton, lettuce, sugar beets, and the like which suffer severe problems of germination and emergence.

In regard to germination and emergence, use of vermiculite in accordance with the foregoing affords the distinct advantages of affording a light-weight, porous, non-crusting or non-cementing, insulating, air and moisture retentive, non-waterlogging covering for the seed. The seed covering thus is not dense or heavy and affords a constant optimum supply of air and moisture to assure germination. The supply of air and moisture enhances development of a vigorous healthy root system. The covering, being non-rusting, accomodates ready emergence of the seedling to afford a uniform plant stand. Also, the moisture conservation and insulating characteristics of vermiculite permit earlier planting of some crops than would normally be the case, particularly in the summer planting of highly seasonal crops, such as lettuce, where a difference of one week in the time of marketing spells the difference between a profitable and non-profitable crop. The results of these basic advantages have been described hereinbefore, as have the substantial savings and production increases afforded thereby.

In addition to the foregoing, the present invention affords an optimum solution to other dominant problems of the farmer, namely those of seed and plant nutrition and protection of the seed and plant from attack by subterranean and surface forms of life deleterious to or destructive of the seed and /or plant, such as subterranean insects, vermin, nematodes, fungus and weeds. In respect to these problems, exfoliated vermiculite is an ideal carrier for plant nutrients and/or biocides, and is adapted to carry either or both in optimum supply without practical diminution of the above-described characteristics that render vermiculite an optimum seed covering.

With respect to vermiculite as a plant nutrient carrier, it has been found that vermiculite has substantially the same base exchange characteristics as Iowa loam. As revealed in recent experimentation, various soils have the capability of ion exchange, so that the roots of various plants may pull whatever ions are required for their continued growth out of the crystalline lattice structure of the soil. The ion exchange characteristics of Iowa loam are very high and, thus, the soil is regarded as being ideal for most crops. Since vermiculite has this same exchange characteristic, the use of vermiculite as described provides additional advantages with relation to stimulating plant growth. Also, it has been recently discovered that plants have a thirst for varying ions during their growth. That is, certain plants, during the initial stages of their growth, may require an abundance of certain ions, while in later growth, the demand for the particular ion is not as great. Accordingly, vermiculite may be fortified by ion exchange prior to use, so that the vermiculite, as the same is utilized for a seed covering, will be capable of supplying the seedling with the particular ions required during the formative stages of growth of the plant. Due to the adsorption of the nutrients by the vermiculite, the nutrients will have a mild and very desirable effect on the plant rootlets. As to application, liquid soluble nutrients may be sprayed onto the vermiculite and non-soluble nutrients, such as rock phosphate, may be finely ground and dry mixed with the vermiculite to obtain even dispersion of the plant nutrients in the covering for the seed. In the resultant product for use as a seed covering, the total amount of plant nutrients is small, probably less than 10% by weight of the vermiculite, and is in relatively inaccessible form for release at a selective rate to the seedling and plant and/or to be extracted from the lattice or laminated structure of the vermiculite by the plant according to its needs. The nutrients have substantially no effect on the basic characteristics of the vermiculite, and do not detract from the advantages thereof as a seed covering. The nutrients afford only beneficial results in enhancing germination and healthy plant growth.

During their growth, plants are subject to attack by, or deleterious effects from, other organisms as above noted. For example, when corn is planted year after year in the same field, the soil in the field becomes heavily infested with wire worms which feed on the root systems of the corn seedlings and stalks. Frequently, the wire worms destroy so much of the seeds and/or young seedlings that the resultant stand is so poor as to necessitate replowing and replanting of the field, even though the second seeding may suffer the same fate as the first. If the plants do grow, the root systems thereof are so depleted by the wire worms that the corn stalks have no stability, are readily blown down and are subject to lodging and goosenecking. Resultant yield is slight, if any. In like manner, most all plants are subject to attack by subterranean insects, vermin and nematodes. Many plants are suceptible to strength-robbing fungi, and weed control is a constant problem. To relieve the farmer of these problems, many proposals have been made for application to the soil of insecticides, nematocides, fungicides and herbicides. A relatively recent proposal has been for the addition of insecticides to starter fertilizers, the fertilizer-insecticide combination to be broadcast or band spread and disked in prior to seeding. However, substantial problems were encountered in applying insecticides directly to fertilizer mixes on a commercial basis. A satisfactory solution is to apply the insecticide to a suitable carrier, Attaclay has been used, and subsequently to mix the insecticide-carrier with the fertilizer. In this application, vermiculite would be an optimum carrier for the insecticide.

According to the present invention, I provide an improved method of treating the plant environment with biocides generally in an efficient, economical and practical manner, specifically by adding a small amount of one or more biocides to vermiculite and employing the biocide-treated vermiculite as a direct seed covering in accordance with the foregoing. The net effect is achievement of the above enumerated advantages of my direct field seeding method in combination with biocide treatment of the seed and root environment of the plant. In this manner, the biocide is not wastefully applied and is concentrated in the area of need to protect the subterranean and surface portions of the plant from attack by or parasitic attachment of undesired organisms.

In accordance with my invention, the biocides to be applied to the vermiculite may vary widely in accordance with the organism or organisms to be controlled, and the amount thereof may vary in accordance with authoritative recommendations for effective control. To my knowledge, substantially all biocides lend themselves to use in accordance with the invention and include herbicides such as 2, 4-D, fungicides such as thiram, nematocides such as ethylene chloride, ethylene dibromide, dichloropropene, propylene dichloride, Nemagon and DDT, and insecticides such as the chlorinated hydrocarbons, heptachlor, Aldrin, Dieldrin, Endrin, Isodrin, Chlordane, Toxaphene, Parathion, Malathion, benzene hexachloride and Lindane.

The biocide or biocides may be applied to the exfoliated vermiculite in any suitable manner, i.e., liquid biocides may be sprayed on, soluble varieties may be dissolved in solvents such as xylene, acetone and kerosene and sprayed on, emulsifiable materials may also be sprayed on, and in some instances, the biocide may be melted and sprayed while hot onto the vermiculite. For example, heptachlor is a particularly efficient insecticide and may be applied to vermiculite by melting the same at about 160° F., raising its temperature to about 212° F. and spraying the same onto insecticide grade granular vermiculite in a ribbon blender.

The amount of biocide to be added to the vermiculite in accordance with the present invention will vary widely as a consequence of two variant factors, first, the amount of vermiculite to be employed per acre, which is dependent upon the nature of the crop (row or hill planted), the spacing of the rows or hills, and the depth or thickness of seed covering, and second, the amount of biocide required for effective control of the organisms to be controlled in a given plot or field and which of the biocides are to be employed. For example, heptachlor, Aldrin and Dieldrin have recommendations for application of from 0.5 to 6 lbs. per acre for treatment of a wide variety of crops against many species of insects, while Chlordane has a recommended application from 0.5 to 10 lbs. per acre and DDT has a recommended application of from 1 to 25 lbs. per acre. These recommendations also cover both hill and row planted crops, so that the proportions of vermiculite and biocide to be employed for a specific crop in a specific area are most properly determined for those specific conditions.

A number of tests have been conducted concerning the effectiveness of insecticides in the treatment of severely infested Iowa corn fields which have been planted in corn for a number of successive years. The first determination to be made is the phytotoxicity of the proposed formulations, and in this respect reference is made to Table 1. Table 1 reports the results of phytotoxicity tests conducted in sand in greenhouse flats. Since the tests were conducted in sand, and in a greenhouse, there was no problem of soil crusting and the percent emergence and mean emergence period referred to therein are not to be confused with the emergence advantages of the present invention as applied to the direct field seeding of various plants in soil exposed to all weather conditions. In the test, new granular formulations were sprinkled over 25 seeds in an 18 inch trench regardless of the insecticide or concentration. Had this dosage of a 20 percent formulation been used in the field on corn planted at 4 seeds per hill in a 40 inch spacing, it would have approximated to 2.16 lbs. of actual insecticide per acre, compared to the recommended concentration of about 1 lb. per acre. Hence this test was considered a severe one suited especially for determination of phytotoxicity. In Table 1, high total emergence and green weight, and low mean emergence period indicates favorable treatment, while the reverse indicates adverse phytotoxicity. As reported, the Attaclay formulations of Aldrin, Dieldrin and Chlordane were definitely phytotoxic while heptachlor on Attaclay and all four insecticide formulations on No. 4 vermiculite showed no adverse phytotoxic effect. The results concerning the 25 percent heptachlor on Attaclay formulation cannot be explained, since independently conducted tests appear to indicate a marked degree of phytotoxicity in a similar formulation. With respect to the phytotoxic effect of the Attaclay formulations, it is presumed that the solvents used in making the formulations resulted in the phytotoxicity. In contrast, vermiculite, because of its larger voids, more readily diffuses the insecticide, and in tumbling the mixture, the solvent is more readily liberated.

TABLE 1.—PHYTOTOXICITY TEST

*Summary of total germination, average green weight of seedlings, and mean emergence period of seedlings of dent corn planted in sand in greenhouse flats in direct contact with granular insecticides*

| Insecticide | Conc. and carrier | Percent emergence (50 seeds) | Aver. seed. weight (grams) | Mean emergence period (days) |
|---|---|---|---|---|
| Aldrin | 20% on Attaclay | 24 | 3.6 | 9.2 |
| Do | 20% on Vermiculite | 92 | 3.1 | 5.1 |
| Heptachlor | 25% on Attaclay | 96 | 3.1 | 6.1 |
| Do | 25% on Vermiculite | 96 | 2.9 | 6.0 |
| Dieldrin | 10% on Attaclay | 58 | 2.6 | 8.4 |
| Do | 10% on Vermiculite | 92 | 2.8 | 4.4 |
| Chlordane | 25% on Attaclay | 58 | 2.6 | 9.2 |
| Do | 25% on Vermiculite | 96 | 2.4 | 5.6 |
| Control | No treatment | 90 | 3.3 | 4.8 |
| Do | do | 94 | 3.4 | 4.8 |

The experiments and tests referred to herein were concerned essentially with insecticidal treatment of corn fields in accordance with the proposal to add the insecticide to the fertilizer mixture, and the test reports are, therefore, limited to determined materials as carriers and to determined methods of use of the insecticide-carrier. These tests nevertheless clearly exhibit the advantages of the present invention over the best known proposals of the art.

In view of the test results on phytotoxicity, two extensive field tests were undertaken, one using heptachlor and the other using Aldrin. In the heptachlor experiment, reported in Table 2, the insecticides used were a 20 percent heptachlor formulation on No. 4, vermiculite, a 25 percent heptachlor formulation on 30–60 mesh R.V.M.-AA Attaclay, both used in a base fertilizer of granular 3–9–27, and a 20 percent heptachlor formulation on No. 4 vermiculite mixed with the seed. All three test plots were compared to an untreated control check (to which only starter fertilizer was applied). All test plots and control checks were thoroughly replicated. All three insecticide formulations showed very marked improvement over the control check, affording three to four times as great emergence and more than two to three times greater yield. As between the two formulations mixed in the starter fertilizer, vermiculite showed substantial advantage over Attaclay, and the test conducted in accordance with the present invention showed very marked improvement over both of those tests. In other words, the vermiculite formulation as mixed directly with the seed afforded substantially greater emergence and substantially greater yield per acre than did the test plots following the proposals of the art. Since the two vermiculite formulations employed were identical except for the method of use, it is apparent that the present invention as compared to mixing of the vermiculite with the fertilizer afforded greater plant emergence as pointed out hereinbefore with respect to my method of direct field seeding.

TABLE 2—HEPTACHLOR EXPERIMENT

*Summary of data on live trapped wireworms, plant stands, and corn yields of corn planted invested field*

| Heptachlor formulation | Replicate | Wireworms collected in 6 traps | | | | Plants in 83⅓ row-feet | Bu./acre of corn corrected to 15.5% moisture |
|---|---|---|---|---|---|---|---|
| | | 6/30 | 7/25 | 9/16 | Total | | |
| Vermiculite in starter fertilizer | 1 | 23 | 17 | 4 | 44 | 118 | 116.4 |
| | 2 | 16 | 5 | 3 | 24 | 115 | 105.3 |
| | 3 | 28 | 17 | 1 | 46 | 121 | 118.7 |
| | 4 | 9 | 7 | 2 | 18 | 99 | 97.4 |
| | 5 | 24 | 4 | 1 | 29 | 73 | 79.0 |
| | 6 | 14 | 12 | 3 | 29 | 108 | 101.6 |
| | 7 | | | | | 117 | 118.7 |
| | 8 | | | | | 121 | 102.5 |
| Average | | 19.0 | 10.3 | 2.3 | 31.7 | 109.0 | 105.0 |
| Attaclay in starter fertilizer | 1 | 27 | 4 | 7 | 38 | 95 | 95.1 |
| | 2 | 21 | 8 | 5 | 34 | 100 | 97.9 |
| | 3 | 25 | 14 | 2 | 41 | 63 | 65.6 |
| | 4 | 20 | 7 | 3 | 30 | 92 | 91.0 |
| | 5 | 14 | 12 | 2 | 28 | 116 | 96.0 |
| | 6 | 20 | 6 | 0 | 26 | 82 | 81.3 |
| | 7 | | | | | 99 | 104.4 |
| | 8 | | | | | 90 | 81.7 |
| Average | | 21.2 | 8.5 | 3.2 | 32.8 | 92.1 | 89.1 |
| Vermiculite mixed with seed | 1 | 21 | 6 | 3 | 30 | 130 | 109.0 |
| | 2 | 21 | 9 | 1 | 31 | 127 | 110.8 |
| | 3 | 18 | 8 | 1 | 27 | 127 | 120.5 |
| | 4 | | | | | 127 | 121.0 |
| | 5 | | | | | 125 | 120.1 |
| | 6 | | | | | 125 | 121.9 |
| | 7 | | | | | 144 | 130.2 |
| | 8 | | | | | 118 | 116.4 |
| Average | | 20.0 | 7.7 | 1.7 | 29.3 | 127.9 | 118.7 |
| Untreated control (starter fertilizer only) | 1 | 76 | 30 | 3 | 109 | 30 | 30.0 |
| | 2 | 95 | 41 | 6 | 142 | 12 | 14.8 |
| | 3 | 25 | 25 | 7 | 86 | 37 | 34.2 |
| | 4 | | | | | 43 | 41.6 |
| | 5 | | | | | 28 | 31.4 |
| | 6 | | | | | 21 | 24.5 |
| | 7 | | | | | 59 | 62.8 |
| | 8 | | | | | 56 | 60.0 |
| Average | | 75.0 | 32.0 | 5.3 | 112.3 | 35.8 | 37.8 |

TABLE 3—ALDRIN EXPERIMENT

*Summary of data on live trapped wireworms, plant stands, and corn yields of corn planted in invested field*

| Aldrin formulation | Replicate | Wireworms collected in 6 traps | | | | Plants in 83⅓ row-feet | Bu./acre of corn corrected to 15.5% moisture |
|---|---|---|---|---|---|---|---|
| | | 6/27 | 7/22 | 9/13 | Total | | |
| Vermiculite in starter fertilizer | 1 | 10 | 4 | 5 | 19 | 133 | 118.2 |
| | 2 | 17 | 9 | 1 | 27 | 128 | 120.2 |
| | 3 | 12 | 3 | 4 | 19 | 109 | 99.2 |
| | 4 | 33 | 15 | 6 | 54 | 146 | 125.2 |
| | 5 | 22 | 6 | 2 | 30 | 79 | 84.6 |
| | 6 | 26 | 7 | 5 | 38 | 86 | 75.6 |
| | 7 | | | | | 127 | 112.2 |
| | 8 | | | | | 111 | 115.2 |
| | 9 | | | | | 117 | 107.2 |
| Average | | 20 | 7.3 | 3.8 | 31.2 | 115.1 | 106.4 |
| Attaclay in starter fertilizer | 1 | 8 | 4 | 1 | 13 | 119 | 107.2 |
| | 2 | 6 | 7 | 5 | 18 | 114 | 94.8 |
| | 3 | 15 | 6 | 1 | 22 | 91 | 90.8 |
| | 4 | 19 | 17 | 0 | 36 | 94 | 86.8 |
| | 5 | 22 | 7 | 3 | 32 | 53 | 53.1 |
| | 6 | 25 | 15 | 3 | 43 | 117 | 57.3 |
| | 7 | | | | | 119 | 95.3 |
| | 8 | | | | | 49 | 49.1 |
| | 9 | | | | | 130 | 108.1 |
| Average | | 15.8 | 9.3 | 2.2 | 27.3 | 98.4 | 82.5 |

TABLE 3—Continued

| Aldrin formulation | Replicate | Wireworms collected in 6 traps | | | | Plants in 83⅓ row-feet | Bu./acre of corn corrected to 15.5% moisture |
|---|---|---|---|---|---|---|---|
| | | 6/27 | 7/22 | 9/13 | Total | | |
| Vermiculite mixed with | 1 | 13 | 5 | 6 | 24 | 126 | 120.2 |
| | 2 | 7 | 15 | 1 | 23 | 124 | 120.2 |
| | 3 | | | | | 146 | 139.1 |
| | 4 | | | | | 115 | 115.5 |
| | 5 | | | | | 122 | 110.7 |
| | 6 | | | | | 109 | 106.9 |
| | 7 | | | | | 127 | 120.2 |
| | 8 | | | | | 101 | 111.6 |
| | 9 | | | | | 121 | 117.8 |
| Average | | 10.0 | 10.0 | 3.5 | 23.5 | 121.2 | 118.0 |
| Untreated control (Starter fertilizer only) | 1 | 61 | 24 | 9 | 94 | 24 | 27.8 |
| | 2 | 133 | 29 | 7 | 169 | 19 | 23.8 |
| | 3 | 84 | 17 | 4 | 105 | 14 | 13.9 |
| | 4 | 96 | 39 | 12 | 147 | 26 | 23.8 |
| | 5 | 68 | 35 | 3 | 106 | 26 | 26.3 |
| | 6 | 95 | 49 | 4 | 148 | 14 | 13.9 |
| | 7 | | | | | 28 | 28.3 |
| | 8 | | | | | 28 | 29.3 |
| | 9 | | | | | 31 | 28.3 |
| Average | | 89.5 | 32.2 | 6.5 | 128.2 | 23.3 | 23.9 |

The Aldrin experiment is reported in Table 3, and substantially duplicates the results and advantages obtained according to the invention in the heptachlor experiment. Specifically, the vermiculite as mixed with the seed in accordance with the invention afforded substantially greater plant emergence and crop yield than either of the formulations mixed in the starter fertilizer.

Concerning the effectiveness of the insecticide treatment of the soil, the principal criterion is the amount of insecticide applied per acre, and the concentration of the insecticide on the vermiculite is not as critical as might be expected so long as a given amount of insecticide is applied per acre to the field. In fact, as reported in Table 4, the lower concentrations of insecticides on vermiculite appear to enhance the effectiveness of the insecticide. As there reported, there is a marked difference between the 10 percent and higher concentrations, while the differences between 10 percent and lower concentrations are less marked, but generally favor the lower concentrations.

TABLE 4.—EFFECTIVENESS OF VARIOUS INSECTICIDE CONCENTRATIONS

*Summary of results of wireworm tests in the laboratory in which two granular insecticide carriers and three insecticides were compared*

| Percent of insecticide on carrier | Lbs. per acre of insecticide | Number dead wireworms in 15 total after 21 days | | | | | |
|---|---|---|---|---|---|---|---|
| | | No. 4 Vermiculite | | | RVM-AA Attaclay | | |
| | | Heptachlor | Aldrin | Dieldrin | Heptachlor | Aldrin | Dieldrin |
| 2 | 1.25 | 7 | 8 | 5 | 11 | 11 | 3 |
| | 2.50 | 10 | 9 | 9 | 12 | 8 | 7 |
| | 5.00 | 15 | 11 | 7 | 15 | 15 | 10 |
| 5 | 1.25 | 9 | 6 | 3 | 9 | 5 | 2 |
| | 2.50 | 9 | 7 | 3 | 11 | 9 | 3 |
| | 5.00 | 13 | 11 | 8 | 13 | 12 | 4 |
| 10 | 1.25 | 9 | 4 | 3 | 7 | 5 | 2 |
| | 2.50 | 9 | 11 | 5 | 9 | 7 | 4 |
| | 5.00 | 13 | 10 | 7 | 14 | 11 | 2 |
| 20 | 1.25 | 3 | 2 | 1 | 3 | 5 | 4 |
| | 2.50 | 11 | 8 | 2 | 6 | 4 | 3 |
| | 5.00 | 13 | 12 | 8 | 11 | 8 | 2 |
| 30 | 1.25 | 4 | 2 | 2 | | | |
| | 2.50 | 6 | 5 | 3 | | | |
| | 5.00 | 11 | 11 | 4 | | | |
| 40 | 1.25 | 8 | 5 | 3 | | | |
| | 2.50 | 5 | 7 | 2 | | | |
| | 5.00 | 9 | 10 | 3 | | | |
| Untreated control | None | 3 | 2 | 2 | | | |
| | None | 1 | 2 | 0 | | | |
| | None | 2 | 1 | 2 | | | |

In accordance with the present invention, the lower concentrations of insecticide on vermiculite will normally be employed, and the greater effectiveness of the said lower concentrations is an unexpected result of the invention. Specifically, the chlorinated hydrocarbon insecticides will most likely be applied in actual practice at the rate of about ¼ lb. to about 2 lbs. per acre for effective control of subterranean insects. For row planted crops, the amount of vermiculite recommended as a seed covering per acre is about 100 to 160 lbs. For hill planted crops, the amount of vermiculite recommended as a seed covering can be as low as 40 lbs. per acre. Thus, to apply from ¼ to 2 lbs. of insecticide and from about 40 to 160 lbs. of vermiculite per acre to a field, the concentration of the insecticide in the vermiculite-insecticide composition will vary from about 0.15 percent to about 4.5, say 5, percent by weight. However, for what appears at present to be an effective upper limit on insecticide recommendations, the concentration of insecticide in the composition may be about 10 percent. The concentrations reported in Table 4 are technical, but generally approximate percent by weight of the composition. The table clearly shows that in the range of up to about 10 percent concentration, the insecticide enjoys its most effective application. Accordingly, the present invention not only insures the above enumerated advantages of germination, emergence and optimum location of the vermiculite, fertilizer and biocide in the immediate vicinity or area of need, but also supplies the biocide in its most effective concentrations.

In contrast to the chlorinated hydrocarbon insecticides, some of the recommended biocides for killing other undesirable organisms in the soil in the vicinity of the seed and/or plant are considerably less effective and their application up to as high as 25 lbs. per acre has been recommended. To satisfy such high requirements, the biocides may be carried by the vermiculite in concentrations up to as high as 40 percent in accordance with the present invention, but I do not contemplate that higher percentages would be required. For my direct field seeding method, I prefer to utilize the biocides in concentrations up to about 5 percent and in some instances 10 percent, and would generally recommend that the concentration be no higher than about 20 percent.

When insecticides such as heptachlor and Aldrin are carried on the vermiculite in accordance with the above recommendations, and the resultant composition is applied as a seed covering for corn seeds at a rate to supply about 1 lb. of the toxicant per acre to the field, the corn seeds are quickly germinated and the seedlings emerge readily to afford a very uniform stand even when hill planted in badly infested fields. A healthy vigorous root system develops, there is no lodging or gooseneckisng of the plants, no wind loss, and the yield per acre is high—very substantially higher than untreated fields. Moreover, the uniform stand of upright stalks facilitates economical, convenient and thorough harvesting of the crop.

In the recommended concentrations, the vermiculite-biocide composition is not phytotoxic, the biocide is retained on the vermiculite in relatively inaccessible form for selective release to the soil to assure optimum soil treatment. In like manner, plant nutrients applied to the vermiculite carrier are retained thereby in relatively inaccessible form for release to the seedlings and plants at a selective rate and/or to be extracted from the vermiculite by the root system of the plant to insure proper nutrition thereof according to the plant's needs.

Both biocides and plant nutrients may be combined with the vermiculite in accordance with the foregoing to afford a complete environment for the seed and the root system of the resultant plant wherein all of the essential factors for proper germination, ready emergence, proper nutrition and protection against other organisms are supplied in a convenient, economical, single application of vermiculite at the time of and conjointly with seeding. When both biocides and plant nutrients are carried by the vermiculite, I prefer to employ in the composition for direct field seeding total nutrient concentrations of up to about 20 percent, and preferably no greater than 10 percent if possible, both by weight.

In practicing the present invention, conventional direct seeding machinery may be employed with the exception that the closing shoes of the machine are eliminated, and a hopper or the like for vermiculite, or nutrient and/or biocide treated vermiculite, is provided to cover the seeds automatically planted by the machine, whether the seeds be planted in rows or hills. For example, a conventional row planter has been converted to provide automatic means for practicing the present invention. In this conversion of the machine, the conventional closing shoes of the planter were removed, and hoppers were provided for feeding vermiculite into the seed furrow on top of the seeds distributed in the furrow by the planter. In this planter, fertilizer was first drilled into the soil to a practical depth and a furrow of one-half to five-eights inch was formed, into which the seeds were distributed. The vermiculite hoppers at the rear of the planter were so adjusted as to fill the furrow and to provide a covering for the seeds therein. With the use of hill planting machines, the vermiculite hopper is provided with automatic means for dropping or feeding a predetermined amount of vermiculite on top of the seeds planted by the machine.

In seeding tomatoes, the seeds are customarily planted one-half to five-eighths of an inch deep. In hill planting according to the present invention, four to six seeds were dropped per hill and approximately four cubic inches of vermiculite was dropped into each hill over the seeds. It was found that, with this number of seeds and this amount of vermiculite, a perfectly uniform stand of plants in hills was obtained. In fact, almost every hill produced more than one plant and, in many cases, as many plants as seeds were dropped.

In any case, the seed covering preferably comprises untreated, or nutrient and/or biocide treated vermiculite.

While I have described my invention with the particularity and to the extent that I know it, it will be appreciated that the same is subject to variation within the scope of the appended claims.

I claim:

1. A method of direct field seeding comprising the steps of sowing seeds, covering substantially all the seeds with essentially a material taken from the group consisting of expanded vermiculite, perlite and light weight foamed slag and mixtures of vermiculite, perlite and slag, and restricting the covering to substantially the area immediately above the seeds.

2. A method of direct field seeding comprising the steps of sowing a seed, subsequently covering the seed with essentially exfoliated vermiculite, and limiting the covering to the immediate vicinity of the seed.

3. A method of direct field seeding, comprising the step of covering essentially all of the sown seeds but only the seeds with essentially a material taken from the group consisting of expanded vermiculite, perlite and lightweight foamed slag and mixtures of vermiculite, perlite and slag.

4. A method of direct field seeding, comprising the step of covering essentially all of but just the sown seeds with essentially exfoliated vermiculite carrying a biocide.

5. A method of direct field seeding, comprising the step of covering essentially all of but just the sown seeds with essentially exfoliated vermiculite carrying a small amount of plant nutrient.

6. A method of direct field seeding comprising the steps of dropping seeds on the ground in a continuous row, covering all of the seeds in the row with essentially exfoliated vermiculite, and restricting the covering to the row of seeds.

7. A method of direct field seeding comprising the steps of dropping seeds on the ground in hills, covering the seeds with essentially exfoliated vermiculite, and limiting the covering to the individual hills.

8. A method of direct field seeding comprising the steps of forming a depression in the ground, dropping at least one seed in the depression and filling just the depression and covering the seed but substantially only the seed with essentially exfoliated vermiculite.

9. A method of direct field seeding comprising the steps of covering a sown seed with a composition which is comprised essentially of 60 to 95% of a material taken from the group consisting of perlite and vermiculite and 40 to 5% of foamed slag, and restricting the covering to substantially the area immediately above the seed.

10. A method of direct field seeding comprising the step of covering just the sown seeds with essentially biocide treated vermiculite at a rate to apply a predetermined amount of biocide per unit area to the field.

11. A method of direct field seeding comprising the steps of covering the sown seeds with essentially exfoliated vermiculite carrying a chlorinated hydrocarbon insecticide, limiting the covering to the immediate vicinity of the seeds, and applying the vermiculite-insecticide composition at a rate to supply from about 0.25 to about 6 pounds of chlorinated hydrocarbon insecticide per acre to the field.

12. A method of direct field seeding comprising the steps of covering the sown seed with essentially exfoliated vermiculite carrying from about 0.15% to about 10% by weight of chlorinated hydrocarbon insecticide, limiting the covering to the immediate vicinity of the seeds, and applying the vermiculite-insecticide seed covering composition at a rate to supply from about 0.25 to about 2 lbs. of chlorinated hydrocarbon insecticide per acre to the field.

13. A method of direct field seeding comprising the steps of covering the sown seeds with essentially exfoliated vermiculite carrying up to about 40% of biocide, limiting the covering to the immediate vicinity of the seeds, and applying the vermiculite-biocide seed covering composition at a rate to supply from about 0.25 to about 25 lbs. of biocide per acre to the field.

14. A method of direct field seeding comprising the steps of covering the sown seeds with essentially exfoliated vermiculite carrying up to about 10% of plant nutrients, and limiting the covering to the immediate vicinity of the seeds.

15. A method of direct field seeding comprising the steps of covering the sown seeds with essentially exfoliated vermiculite carrying up to about 10% by weight of plant nutrient and up to about 20% by weight of biocide, limiting the covering to the immediate vicinity of the seeds, and applying the vermiculite-plant nutrient-biocide composition at a rate to supply up to about 25 lbs. of biocide per acre to the field.

References Cited in the file of this patent

UNITED STATES PATENTS

| | | |
|---|---|---|
| 1,608,917 | Widdis | Nov. 30, 1926 |
| 1,735,835 | McCallum | Nov. 12, 1929 |
| 2,240,859 | Rice | May 6, 1941 |
| 2,403,435 | Hammer | July 9, 1946 |
| 2,419,073 | Hammer | Apr. 15, 1947 |
| 2,625,529 | Hedrick | Jan. 13, 1953 |
| 2,765,290 | Ziegler | Oct. 2, 1956 |

OTHER REFERENCES

"Destructive and Useful Insects" (Metcalf et al.), published by McGraw-Hill (N.Y.) 1939; second edition, pages 391 through 394 are relied on.

New York Times (Newspaper), Sunday, October 12, 1947, Section 2, page 20-X, article "Around the Garden" by Jenkins.

Washington Post (Newspaper), Sunday, March 25, 1951, section on Gardening and Homemaking, page 2, article "Go Light on the Lawn Seed."